United States Patent Office 3,657,147
Patented Apr. 18, 1972

3,657,147
NOVEL STANDARDS FOR N.M.R. SPECTROSCOPY
Ludwig Pohl, Frankfurter, and Manfred Eckle, Darmstadt, Germany, assignors to Merck Patent Gesellschaft mit beschränkter Haftung, Darmstadt, Germany
No Drawing. Filed July 22, 1969, Ser. No. 843,824
Claims priority, application Germany, July 27, 1968, P 17 73 928.5; Aug. 1, 1968, P 17 73 959.2; Mar. 21, 1969, P 19 14 385.2
Int. Cl. C07d *103/02;* G01n *27/78, 33/08*
U.S. Cl. 252—408                                            10 Claims

ABSTRACT OF THE DISCLOSURE

For N.M.R. determinations, there are provided improved standards as follows:
(a) 1,1,3,3,5,5 - hexakis - (trideuteromethyl)-1,3,5-trisila-cyclohexane,
(b) α,α,β,β - tetradeutero - β - (trimethylsilyl) - propionic acid,
(c) α,α,β,β,O - pentadeutero - β - (trimethylsilyl) - propionic acid,
(d) an alkali metal salt of (b),
(e) an alkali metal salt of (c),
(f) β-(trimethylsilyl)-propionic acid, and
(g) an alkali metal salt of (f).

This invention relates to standard reagents used in nuclear magnetic resonance (N.M.R.).

In N.M.R. measurements, the standard employed in organic solutions is almost exclusively tetramethylsilane, abbreviated as (TMS), and in aqueous solutions is primarily the sodium salt of γ-(trimethylsilyl)-propanesulfonic acid, abbreviated as (A). These compounds exhibit certain disadvantages, and cannot be said to be ideal standards. The standard (TMS) has a very low boiling point (+27° C.) and consequently is unsuitable for measurements at higher temperatures, whereas the standard (A) exhibits, in addition to the standard signal, three additional resonant ranges which interfere with the spectrum.

A principal object of this invention, therefore, is to provide improved standards for N.M.R. spectroscopy.

Upon further study of the specification and claims, other objects and advantages of the present invention will become apparent.

To attain these objects, it has now been discovered that certin organosilicon compounds do not possess the disadvantages of the prior art standards and can be advantageously employed as standards for N.M.R. spectroscopy. These compounds, when used in organic solvents, are 1,1,3,3,5,5 - hexakis - (trideuteromethyl) - 1,3,5 - trisila-cyclohexane ("Cyclosilane-d₁₈"); designated as (I)

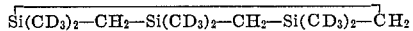

and

β-(trimethylsilyl)-propionic acid and deuterated forms thereof, designated as (II)

$$(CH_3)_3\text{—}SiCH_2CH_2COOH \qquad II$$

The deuterated forms of (II) are especially effective, particularly α,α,β,β - tetradeutero - β - (trimethylsilyl) - propionic acid $(CH_3)_3SiCD_2\text{—}CD_2COOH$ and α,α,β,β,O-pentadeutero - β - (trimethylsilyl) - propionic acid

(IIa). When used in aqueous solutions, the compounds are employed in the form of the alkali metal salts, e.g. Li, K, Na, Rb, Cs, preferably the sodium salt of β-(trimethylsilyl) - propionic acid $(CH_3)_3SiCH_2CH_2COONa$ (III), particularly the sodium salt of α,α,β,β-tetradeutero-β-(trimethylsilyl)-propionic acid $(CH_3)_3SiCD_2CD_2COONa$ (IIIa). In addition to the sodium salt III (or IIIa), it is also possible to employ the corresponding potassium salt as well as the lithium salt, for the same purpose.

(I) boils at 208° C., (II) at 100° C./10 mm. Both (I) and (II) are readily soluble in conventional organic solvents, e.g. chloroform, methanol, tetrahydrofuran or dimethyl sulfoxide. Accordingly, these two compounds can be employed as standard substances even at high temperatures, and do not boil out of the solution as in the case of (TMS). Thereby, it is possible to conduct measurements up to at least 200° C., and also by the "internal lock technique," the latter being impossible with (TMS). An additional advantage exhibited by substance (I) over (TMS) is a chemical shift of —0.33 p.p.m.; consequently, substance (I) can be utilized as a lock signal for all measurements above +0 p.p.m. This makes it possible to obtain, by means of a single measurement, undisturbed spectra of three ring systems or steroids exhibiting resonant signals between 0.6 and 0.0 p.p.m.

Compound (III) has a lower molecular weight and a better water solubility than (A). Whereas the conventional standard compound (A) exhibits, with respect to (TMS), a chemical shift of the trimethylsilyl signal of +0.015 p.p.m., the compounds (II) and the sodium salts (III) thereof do not exhibit a chemical shift of the trimethylsilyl signal as compared to (TMS). Due to the more favorable mass ratio of the (CH₃)₃—Si-group in (III) with respect to the remainder of the molecule, a smaller amount of substance is required for the generation of an equally strong signal than with the use of the conventional standard substance A.

All of (I), (II), and (III) are stable with respect to acids and bases, and are heat resistant up to at least 200° C.

The pentadeutero compound (IIa) and the deuterated salt (IIIa) exhibit, besides the standard signal, no further resonant ranges, and thus do not yield any background noise in the range of the spectra proper.

The compounds (I), (II) and (III) can be used as N.M.R. standards with particular advantage for controlling manufacturing processes or testing the purity of the products produced thereby. Such controlling and testing by means of N.M.R. spectroscopy is well known in the art as such.

For example, the purity and degree of deuteration of commercial highly deuterated organic compounds can be determined most accurately by means of N.M.R. spectroscopy. Solid substances can be tested with this method in the molten state only, but the determination of the degree of deuteration of such molten substances at temperatures above 100° C. was very unsatisfactory heretofore, since no suitable high boiling standards were available. By applying compound I as a standard it is now readily feasible to test by N.M.R.-spectroscopy the deuterium contents of high melting products such as naphthalene-d₁₀ (M.P. 80° C.), phenanthrene-d₁₂ (M.P. 100° C.) or succinic anhydride-d₄ (M.P. 120° C.).

As another example, the purity of water-soluble drugs, such as tetracycline derivatives, can now be measured by N.M.R. spectroscopy, preferably in aqueous solution by using (IIIa) as a water-soluble standard without interfering self-absorption.

The non-deuterated form of (I) is conventional; however, the deuterated form (I) is novel. The latter is obtainable by reacting methylene chloride on a Si-Cu(I)-chloride catalyst and subsequent Grignardation of the thus-obtained 1,1,3,3,5,5 - hexachloro-1,3,5-trisila-cyclohexane with trideuteromethyl mangesium chloride, bromide or iodide.

The non-deuterated β - (trimethylsilyl)-propionic acid and the sodium salt thereof are known and can be produced, for example, by hydrolyzing the corresponding nitrile with a boiling, aqueous-alcoholic solution of sodium hydroxide and to obtain the free acid acidifying the resultant salt solution. Deuterated forms can be obtained, for example, by boiling, for a certain period of time, β-(trimethylsilyl)-propionic acid nitrile optionally, partially or completely deuterated in the α- and β-position. The aforesaid nitrile is obtainable, for example, by reacting trichlorosilane with trideuteroacrylonitrile and subsequent reaction with methylmagnesium iodide; this boiling step is conducted with an aqueous-alcoholic sodium deuterooxide-(deutero-sodium hydroxide-, NaOD-), solution. In this reaction, the nitrile group is saponified, and simultaneously the remaining hydrogen atoms in the α- and β-position are exchanged against deuterium. Subsequent acidification in $H_2O$ or $D_2O$ results in the above-mentioned tetradeutero- or pentadeuteropropionic acids.

Another way of synthesizing (II) or (III) comprises:

(a) The reaction of sodium acetylidene with trimethylchlorosilane in ethylene glycol diethyl ether to trimethylsilyl-acetylene;

(b) Reaction with ethyl magnesium bromide in ether to the Grignard derivative $(CH_3)_3SiC≡CMgBr$;

(c) Reaction with solid $CO_2$;

(d) Subsequent hydrolysis to $(CH_3)_3SiC≡C—COOH$ or $(CH_3)_3SiC≡C—OOD$; and (e) Catalytic hydrogenation or deuteration on palladium at 50 atmospheres.

With respect to the technique for using (I) and (II) for N.M.R. spectroscopy, they are employed as standard substances in the same manner as the conventional standard compound (TMS); several drops (about 0.01 to 0.05 ml.) of substance (I) or (II) are added to the test solution (about 0.5–1 ml.) of the substance to be examined. The solvents used are the conventional ones, for example $CH_2Cl_2$, $CD_2Cl_2$, $CHCl_3$, $CDCl_3$, $CCl_4$, $CH_3OH$, $CH_3OD$, $CD_3OD$, $C_2H_5OH$, $C_2H_5OD$, $C_2D_5OD$, tetrahydrofuran, tetrahydrofuran, -$d_8$, $(CH_3)_2SO$, $(CD_3)_2SO$,

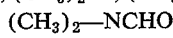

$(CD_3)_2$—NCDO, $C_6H_6$, $C_6D_6$, dioxane, dioxane-$d_8$, $(CH_3)_2CO$, $(CD_3)_2CO$, $[(CH_3)_2N]_3P=O$ or $[(CD_3)_2N]_3P=O$ Then the determination is conducted. When using (I), bases, e.g. pyridine-$d_5$, are likewise suitable as solvents. When investigating the N.M.R. spectra of liquids, it is also possible to use these liquids as solvents and to work without an additional solvent.

In accordance with the invention, all organic solvents conventional to N.M.R. spectroscopy can be employed; the selection of the most suitable solvent depends on the substance to be examined. On a weight percent basis, the test solution contains about 0.5 to 5% standard compound (I or II); 0 to 98% of the organic solvent; and 1 to 99% of the substance to be measured.

Compound (III) is employed as the standard substance in N.M.R. spectroscopy in the same manner as the conventional standard compound (A); approximately 2–5 mg. of standard (III) is added to the (preferably) aqueous test solution (about 0.5–1 ml.) of the substance to be examined, and then the determination is conducted. It is, of course, also possible to apply III in such non-aqueous solvents in which it is soluble, such as methanol, ethanol, hexamethylphosphoric acid triamide and their deuterated forms, or, when spectra of liquids are determined, to work without an additional solvent. In all of these cases, the test solution contains on a weight percentage basis about 0.5 to 1% standard III; 1 to 99.5% of the substance to be measured, and 0 to 98.5% solvent (preferably water or deuterium oxide, respectively).

The determinations are conducted conventionally, reference being made to any standard textbook on the subject, for example, Emsley, Feeney and Sutcliffe, High Resolution NMR-Spectroscopy, Pergamon Press, Oxford (1965).

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

A solution of 10.35 g. of 1,1,3,3,5,5-hexachloro-1,3,5-trisila-cyclohexane in 75 ml. of absolute ether is slowly added to a Grignard solution prepared from 51.3 g. of trideuteromethyl iodide and 8.34 g. of Mg in 225 ml. of absolute ether; this is done in such a manner that the mixture boils very gently. The resultant reaction solution is boiled for one additional hour, then decomposed with water and dilute hydrochloric acid, a separation step is conducted, and the aqueous phase is extracted several times with ether and the combined ether phases are dried over sodium sulfate. After removal of the ether, there is obtained 1,1,3,3,5,5 - hexakis(trideuteromethyl)-1,3,5-trisila-cyclohexane having a boiling point of 42–48° C./4 mm.

EXAMPLE 2

Three grams of partially deuterated β-(trimethylsilyl)-propionic acid nitrile of the formula $(CH_3)_3Si—CD_2—CHD—CN$ is boiled for 10 hours with 10 ml. of a 50% solution of NaOD in deuterium oxide and 10 ml. of ethanol -$d_1$ ($C_2H_5OD$). After ammonium evolution ceases, the mixture is concentrated by evaporation in a water bath. The thus-obtained crude sodium salt of α,α,β,β-tetradeutero-β-(trimethylsilyl)-propionic acid is dissolved in 10 ml. of ethanol, the solution heated with activated charcoal, filtered, and again concentrated by evaporation, thus obtaining pure (IIIa) which can be employed in this form as the standard for N.M.R. spectroscopy.

The free acid can be obtained by dissolving the pure sodium salt in water or $D_2O$ and subsequent acidification (e.g. with dilute $H_2SO_4$ or $D_2SO_4$), extraction of the solution with methylene chloride, separation, drying and concentration by evaporation, into the free α,α,β,β-tetradeutero- or α,α,β,β,O-pentadeutero - β - (trimethylsilyl)-propionic acid (boiling point: 100° C./10 mm.; molecular weight 150 and 151, respectively).

The starting material is obtained by reacting trichlorosilane with trideuteroacrylonitrile in the presence of triethylamine (5 hours at 160° C. under a nitrogen atmosphere) and subsequent reaction with excess methylmagnesium iodide in ether.

The following are examples of typical test solutions employing the standards of this invention:

EXAMPLE A

| | Percent |
|---|---|
| 1,1,3,3,5,5 - hexakis-(trideuteromethyl)-1,3,5-trisila-cylohexane (I) | 1 |
| Cholesterol | 5 |
| Chloroform $CDCl_3$ | 94 |

EXAMPLE B

| | |
|---|---|
| I | 1 |
| Chlorin-$e_6$ | 1 |
| Dichloromethane-$d_2$ | 98 |

EXAMPLE C

| | |
|---|---|
| I | 2 |
| Liquid paraffine | 20 |
| Tetrachloromethane | 78 |

EXAMPLE D

| | |
|---|---|
| I | 2 |
| n-Propylamine | 10 |
| Pyridine-$d_5$ | 88 |

EXAMPLE E

| | Percent |
|---|---|
| I | 2 |
| Aniline | 10 |
| Tetrahydrofuran-$d_8$ | 88 |

EXAMPLE F

| | Percent |
|---|---|
| I | 1 |
| Chlormadinone acetate | 5 |
| Dimethylsulfoxide-$d_6$ | 94 |

EXAMPLE G

| | |
|---|---|
| I | 4 |
| Tryptophan | 15 |
| Dimethylformamide-$d_7$ | 81 |

EXAMPLE H

| | |
|---|---|
| I | 2 |
| Naphthalene | 2 |
| Benzene-$d_6$ | 96 |

EXAMPLE I

| | |
|---|---|
| I | 3 |
| Trimethylphosphine oxide | 20 |
| Dioxane-$d_8$ | 77 |

EXAMPLE J

| | |
|---|---|
| I | 5 |
| Pyridine | 30 |
| Acetone-$d_6$ | 65 |

EXAMPLE K

| | |
|---|---|
| I | 1 |
| Decahydronaphthalene | 99 |

EXAMPLE L

| | |
|---|---|
| β-(Trimethylsilyl)-propionic acid (II) | 1 |
| Pyridoxine hydrochloride | 20 |
| Methanol-$d_4$ | 79 |

EXAMPLE M

| | |
|---|---|
| II | 5 |
| Tetracycline hydrochloride | 5 |
| Hexamethylphosphoric acid triamide-$d_{18}$ | 90 |

EXAMPLE N

| | |
|---|---|
| α,α,β,β-Tetradeutero - β - (trimethylsilyl)-propionic acid | 1 |
| Glucose | 8 |
| Methanol-$d_4$ | 91 |

EXAMPLE O

| | |
|---|---|
| α,α,β,β-Tetradeutero - β - (trimethylsilyl)-propionic acid | 0.5 |
| Pyrimidine | 25 |
| Ethanol-$d_6$ | 74.5 |

EXAMPLE P

| | |
|---|---|
| α,α,β,β,O-pentadeutero - β - (trimethylsilyl)-propionic acid (IIa) | 0.8 |
| Isoquinoline | 25 |
| Dimethylsulfoxide | 74.2 |

EXAMPLE Q

| | |
|---|---|
| IIa | 1 |
| Trans-stilbene | 12 |
| Chloroform-d | 87 |

EXAMPLE R

| | |
|---|---|
| IIa | 1 |
| β-Pinene | 5 |
| Tetrachloromethane | 94 |

EXAMPLE S

| | |
|---|---|
| IIa | 0.5 |
| Indole | 10 |
| Dimethylformamide | 89.5 |

EXAMPLE T

| | Percent |
|---|---|
| Sodium β-(trimethylsilyl)-propionate (III) | 0.5 |
| Arabinose | 15 |
| Deuterium oxide | 84.5 |

EXAMPLE U

| | |
|---|---|
| III | 0.7 |
| Tetramethyl-urea | 25 |
| Water | 74.3 |

EXAMPLE V

| | |
|---|---|
| Sodium α,α,β,β-tetradeutero - β - (trimethylsilyl)-propionate (IIIa) | 0.5 |
| Sodium-β-iodopropionate | 20 |
| Deuterium oxide | 79.5 |

EXAMPLE W

| | |
|---|---|
| IIIa | 0.8 |
| Papaverine hydrochloride | 18 |
| Hexamethylphosphoric acid triamide-$d_{18}$ | 81.2 |

EXAMPLE X

| | |
|---|---|
| Succinic acid | 30 |
| Methanol-$d_4$ | 69 |

EXAMPLE Y

| | |
|---|---|
| IIIa | 0.5 |
| Ethylene glycol | 99.5 |

EXAMPLE Z

| | |
|---|---|
| IIIa | 0.5 |
| Phenol | 1 |
| Deuterium oxide | 98.5 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

The embodiments of the invention in which an exclusive property or privilege is claimed are defined as follows:

1. A compound suitable for use as a nuclear magnetic resonance spectroscopy standard, said compound being a member selected from a group consisting of:
   (a) 1,1,3,3,5,5-hexakis - (trideuteromethyl) - 1,3,5 - trisila-cyclohexane,
   (b) α,α,β,β-tetradeutero - β - (trimethylsilyl)-propionic acid,
   (c) α,α,β,β,O-pentadeutero - β - (trimethylsilyl)-propionic acid,
   (d) an alkali metal salt of (b), and
   (e) an alkali metal salt of (c).

2. A member as defined by claim 1, wherein said member is 1,1,3,3,5,5-hexakis-(trideuteromethyl)-1,3,5-trisila-cyclohexane.

3. A member as defined by claim 1 wherein said member is α,α,β,β-tetradeutero - β - (trimethylsilyl)-propionic acid.

4. A member as defined by claim 1, wherein said member is α,α,β,β,O-pentadeutero-β-(trimethylsilyl)-propionic acid.

5. A member as defined by claim 1 wherein said member is an alkali metal salt of α,α,β,β-tetradeutero-β-(trimethylsilyl)-propionic acid.

6. A member as defined by claim 1 wherein said member is an alkali metal salt of α,α,β,β,O-pentadeutero-β-(trimethylsilyl)-propionic acid.

7. In the process of determining the nuclear magnetic resonance spectrum of a compound wherein a standard is employed in conjunction with said compound to be determined, the improvement comprising employing as said standard a member selected from the group consisting of:
- (a) 1,1,3,3,5,5 - hexakis - (trideuteromethyl)-1,3,5-tri-sila-cyclohexane,
- (b) α,α,β,β-tetradeutero - β - (trimethylsilyl)-propionic acid,
- (c) α,α,β,β,O-pentadeutero - β - (trimethylsilyl)-propionic acid,
- (d) an alkali metal salt of (b),
- (e) an alkali metal salt of (c),
- (f) β-(trimethylsilyl)-propionic acid, and
- (g) an alkali metal salt of (f).

8. A process as defined by claim 7, wherein said process comprises adding said standard to an organic solvent and wherein said member is selected from the group consisting of:
- (a) 1,1,3,3,5,5,-hexakis - (trideuteromethyl) - 1,3,5-tri-sila-cyclohexane,
- (b) α,α,β,β-tetradeutero - β - (trimethylsilyl)-propionic acid,
- (c) α,α,β,β,O - pentadeutero - β - (trimethylsilyl)-propionic acid, and
- (f) β-(trimethylsilyl)-propionic acid.

9. A process as defined by claim 8 wherein said process comprises adding said standard to an aqueous solution and wherein said member is selected from the group consisting of:
- (d) an alkali metal salt of α,α,β,β-tetradeutero-β-(trimethylsilyl)-propionic acid,
- (e) an alkali metal salt of α,α,β,β,O-pentadeutero-β-(trimethylsilyl)-propionic acid, and
- (g) an alkali metal salt of β-(trimethylsilyl)propionic acid.

10. A process as defined by claim 9, wherein said alkali metal is sodium.

References Cited
UNITED STATES PATENTS 3,141,898  7/1964  Tiers _____ 324—.5 X
3,495,162  2/1970  Nelson _____ 324—.5

JOHN T. GOOLKASIAN, Primary Examiner

M. E. McCAMISH, Assistant Examiner

U.S. Cl. X.R.

260—448.2, 540; 324—.5